(12) United States Patent
Kabbani et al.

(10) Patent No.: US 9,565,114 B1
(45) Date of Patent: Feb. 7, 2017

(54) WEIGHTED LOAD BALANCING USING SCALED PARALLEL HASHING

(71) Applicant: GOOGLE INC., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 14/217,921

(22) Filed: Mar. 18, 2014

Related U.S. Application Data (60) Provisional application No. 61/950,024, filed on Mar. 8, 2014.

(51) Int. Cl.
*H04L 12/801* (2013.01)
*H04L 12/803* (2013.01)
*H04L 12/743* (2013.01)
*H04L 12/721* (2013.01)

(52) U.S. Cl.
CPC .............. *H04L 47/125* (2013.01); *H04L 45/44* (2013.01); *H04L 45/7453* (2013.01)

(58) Field of Classification Search
CPC ...................................................... H04L 47/125
USPC ............... 370/235, 392, 229, 384, 401, 252, 351, 370/359, 360
See application file for complete search history.

(56) References Cited

U.S. PATENT DOCUMENTS

| | | | | |
|---|---|---|---|---|
| 6,356,546 B1 * | 3/2002 | Beshai | ................... | H04L 45/302 370/358 |
| 6,580,721 B1 * | 6/2003 | Beshai | ................ | H04L 12/5693 370/395.2 |
| 6,721,800 B1 * | 4/2004 | Basso | ..................... | H04L 45/00 709/239 |
| 6,765,866 B1 * | 7/2004 | Wyatt | ................... | H04L 49/256 370/229 |
| 7,523,218 B1 * | 4/2009 | Sahni | ...................... | H04L 45/14 709/238 |
| 7,697,432 B2 * | 4/2010 | Yu | ....................... | H04L 45/7457 370/235 |
| 7,843,926 B1 * | 11/2010 | Muller | .................. | G06F 13/102 370/392 |
| 7,898,959 B1 * | 3/2011 | Arad | ...................... | H04L 45/00 370/235 |

(Continued)

OTHER PUBLICATIONS

Liu, et al, "zUpdate: Updating Data Center Networks with Zero Loss", SIGCOMM'13, Aug. 12-16, 2013, 12 pages.

(Continued)

*Primary Examiner* — Parth Patel
(74) *Attorney, Agent, or Firm* — McDermott Will & Emery LLP (57) ABSTRACT

A method for weighted data traffic routing can include receiving a data packet at data switch, where the data switch includes a plurality of egress ports. The method can also include, for each of the egress ports, generating an independent hash value based on one or more fields of the data packet and generating a weighted hash value by scaling the hash value using a scaling factor. The scaling factor can be based on at least two traffic routing weights of a plurality of respective traffic routing weights associated with the plurality of egress ports. The method can further include selecting an egress port of the plurality of egress ports based on the weighted hash value for each of the egress ports and transmitting the data packet using the selected egress port.

10 Claims, 4 Drawing Sheets

(56) References Cited

U.S. PATENT DOCUMENTS

| | | | | |
|---|---|---|---|---|
| 8,982,700 | B1* | 3/2015 | Zhou | H04L 45/125 370/229 |
| 2003/0016666 | A1* | 1/2003 | Okamoto | H04L 45/00 370/389 |
| 2003/0105976 | A1* | 6/2003 | Copeland, III | G06F 21/552 726/4 |
| 2006/0178153 | A1* | 8/2006 | Tenny | H04W 48/20 455/450 |
| 2007/0288760 | A1* | 12/2007 | Euchner | G07B 17/00508 713/189 |
| 2009/0116488 | A1* | 5/2009 | Schollmeier | H04L 29/06 370/392 |
| 2009/0268674 | A1* | 10/2009 | Liu | H04W 72/02 370/329 |
| 2010/0302935 | A1* | 12/2010 | Zhang | H04L 45/02 370/218 |
| 2011/0013638 | A1* | 1/2011 | Matthews | H04L 45/00 370/395.32 |
| 2011/0013639 | A1* | 1/2011 | Matthews | H04L 45/00 370/395.32 |
| 2011/0161657 | A1* | 6/2011 | So | H04L 29/12207 713/153 |
| 2011/0188503 | A1* | 8/2011 | Hewson | H04L 45/02 370/392 |
| 2011/0202612 | A1* | 8/2011 | Craig | H04L 63/0892 709/206 |
| 2011/0310739 | A1* | 12/2011 | Aybay | H04L 47/10 370/235 |
| 2012/0170575 | A1* | 7/2012 | Mehra | H04L 41/00 370/359 |
| 2013/0201989 | A1* | 8/2013 | Hu | H04L 45/24 370/392 |
| 2013/0232104 | A1* | 9/2013 | Goyal | G06N 5/02 706/59 |
| 2013/0308455 | A1* | 11/2013 | Kapadia | H04L 47/125 370/235 |
| 2013/0329584 | A1* | 12/2013 | Ghose | H04L 45/586 370/252 |
| 2014/0032156 | A1* | 1/2014 | Sanyal | G01R 31/318371 702/119 |
| 2014/0040433 | A1* | 2/2014 | Russell, Jr. | H04L 65/60 709/219 |
| 2014/0181298 | A1* | 6/2014 | Wang | H04L 41/5022 709/224 |
| 2014/0198656 | A1* | 7/2014 | Venkatesh | H04L 47/125 370/235 |
| 2014/0301394 | A1* | 10/2014 | Arad | H04L 45/7453 370/392 |
| 2015/0078375 | A1* | 3/2015 | Hendel | H04L 45/7453 370/389 |
| 2015/0163140 | A1* | 6/2015 | Rovner | H04L 45/745 370/392 |
| 2015/0180782 | A1* | 6/2015 | Rimmer | H04L 49/70 370/236 |
| 2015/0180790 | A1* | 6/2015 | Rimmer | H04L 47/39 370/368 |
| 2015/0222533 | A1* | 8/2015 | Birrittella | H04L 45/66 370/392 |
| 2015/0244617 | A1* | 8/2015 | Nakil | H04L 45/70 709/224 |
| 2015/0326476 | A1* | 11/2015 | Ye | H04L 45/745 370/235 |
| 2016/0050272 | A1* | 2/2016 | Raduchel | H04L 67/1095 709/204 |

OTHER PUBLICATIONS

Al-Fares, Mohammad, et al. A Scalable, Commodity Data Center Network Architecture, ACM SIGCOMM Computer Communication Review, vol. 38. No. 4, pp. 63-74, ACM, 2008.

Zhou, Junlan, et al. WCMP: Weighted Cost Multipathing for Improved Fairness in Data Centers, Proceedings of the Ninth European Conference on Computer Systems. ACM, Apr. 13-16, 2014.

* cited by examiner

WEIGHTED LOAD BALANCING USING SCALED PARALLEL HASHING

CROSS-REFERENCE TO RELATED APPLICATION

This application is a Nonprovisional of, and claims priority to, U.S. Patent Application No. 61/950,024, filed on Mar. 8, 2014, entitled "WEIGHTED LOAD BALANCING USING PARALLEL HASHING", which is incorporated by reference herein in its entirety.

TECHNICAL FIELD

This description relates to systems and techniques for weighted load balancing in a multistage network.

BACKGROUND

A network may include a multistage network, which may include a wired and/or wireless network. In some example implementations, a multistage network may be used in the context of telecommunication and data centers to realize large-scale networks. A multistage network in a data center may have a large shared infrastructure of shared resources. In the multistage network, there may be multiple paths on which to send traffic between a source device and a destination device using the shared infrastructure. Weighted routing of data traffic over such multiple paths can be used to load balance data traffic in a multistage networks. However, current approaches for weighted may be complicated to implement in large multistage networks, such as, for example, data center networks.

SUMMARY

According to one general aspect, a method for routing packets in a network includes receiving, at a data switch, a data packet, the data switch including a plurality of egress ports. The method includes, for each of the egress ports, generating, by the data switch, an independent hash value based on one or more fields of the data packet and generating a weighted hash value by scaling the hash value using a scaling factor, the scaling factor being based on at least two traffic routing weights of a plurality of respective traffic routing weights associated with the plurality of egress ports. The method also includes selecting an egress port of the plurality of egress ports based on the weighted hash value for each of the egress ports and transmitting, by the data switch, the data packet using the selected egress port.

Implementations can include one or more of the following features. For example, the one or more fields of the data packet can include one or more fields of a header of the data packet, where the one or more fields of the header of the data packet can have fixed values for each data packet of a data flow associated with the data packet.

Generating independent hash values for the plurality of egress ports can include generating a first hash value using a first hash function, where the first hash value is associated with a first egress port of the plurality of egress ports, and generating a second hash value using a second hash function, where the second hash value is associated with a second egress port of the plurality of egress ports, The second hash function can be different than, and independent of, the first hash function. Generating independent hash values for the plurality of egress ports further can include generating a third hash value using a third hash function. The third hash value can be associated with a third egress port of the plurality of egress ports. The third hash function can be different than, and independent of, the first hash function and the second hash function.

A scaling factor for a given egress port of the plurality of egress ports can be a ratio of a probability of the given egress port being selected in a joint probability distribution for the plurality of egress ports with a probability of an egress port with a lowest routing weight of the respective traffic routing weights being selected in the joint probability distribution. The probability of the given egress port being selected in the joint probability distribution can be proportional with a routing weight associated with the given egress port.

The plurality of routing weights can be normalized such that a smallest routing weight of the plurality of routing weights has a normalized value of 1. Generating the independent hash value for each of egress ports can include normalizing a plurality of respective independent hash values for the plurality of egress ports to respective values in a range of 0 to 1. Selecting the egress port of the plurality of egress ports can include selecting an egress port of the plurality of egress ports having a highest respective scaled hash value.

In another general aspect, a data switch including a plurality of egress ports includes at least one memory that is configured to store instructions and at least one processor that is operably coupled to the at least one memory and that is configured to process the instructions to cause the data switch to receive a data packet. The instructions further cause the data switch, for each of the egress ports, to generate an independent hash value based on one or more fields of the data packet and generate a weighted hash value by scaling the hash value using a scaling factor. The scaling factor is based on at least two traffic routing weights of a plurality of respective traffic routing weights associated with the plurality of egress ports. The instructions further cause the data switch to select an egress port of the plurality of egress ports based on the weighted hash value for each of the egress ports and transmit the data packet using the selected egress port.

Implementations can include one or more of the following features. For example, generating independent hash values for the plurality of egress ports can include generating a first hash value using a first hash function, where the first hash value is associated with a first egress port of the plurality of egress ports, and generating a second hash value using a second hash function, where the second hash value is associated with a second egress port of the plurality of egress ports, The second hash function can be different than, and independent of, the first hash function. Generating independent hash values for the plurality of egress ports further can include generating a third hash value using a third hash function. The third hash value can be associated with a third egress port of the plurality of egress ports. The third hash function can be different than, and independent of, the first hash function and the second hash function.

A scaling factor for a given egress port of the plurality of egress ports can be a ratio of a probability of the given egress port being selected in a joint probability distribution for the plurality of egress ports with a probability of an egress port with a lowest routing weight of the respective traffic routing weights being selected in the joint probability distribution. The probability of the given egress port being selected in the joint probability distribution can be proportional with a routing weight associated with the given egress port.

Selecting the egress port of the plurality of egress ports can include selecting an egress port of the plurality of egress ports having a highest respective scaled hash value.

The one or more fields of the data packet can include one or more fields of a header of the data packet, the one or more fields of the header of the data packet having fixed values for each data packet of a data flow associated with the data packet.

In another general aspect, a method includes receiving, at a data switch, a set of respective traffic routing weights for a plurality of egress ports of the data switch, each egress port of the plurality of egress ports being associated with a respective independent hash function. The method also includes determining, for the plurality of egress ports, a plurality of respective hash function scaling factors, the plurality of respective hash function scaling factors being based on the set of routing weights and a joint probability distribution for the plurality of egress ports. The method also includes routing a data packet using the respective independent hash functions and the respective hash function scaling factors.

Implementations can include one or more of the following features. For example, a scaling factor for a given egress port of the plurality of egress ports can be a ratio of a probability of the given egress port being selected in a joint probability distribution for the plurality of egress ports with a probability of an egress port with a lowest routing weight of the respective traffic routing weights being selected in the joint probability distribution. The probability of the given egress port being selected can be proportional with a routing weight associated with the given egress port. The plurality of routing weights can be normalized such that a smallest routing weight of the plurality of routing weights has a normalized value of 1. Determining the plurality of respective hash function scaling factors includes iteratively determining the plurality of hash function scaling factors.

In another general aspect, a data switch includes at least one memory that is configured to store instructions and at least one processor that is operably coupled to the at least one memory and that is configured to process the instructions to cause the data switch to receive a set of respective traffic routing weights for a plurality of egress ports of the data switch, each egress port of the plurality of egress ports being associated with a respective independent hash function. The instructions further cause the data switch to determine, for the plurality of egress ports, a plurality of respective hash function scaling factors, the plurality of respective hash function scaling factors being based on the set of routing weights and a joint probability distribution for the plurality of egress ports. The instructions also cause the data switch to route a data packet using the respective independent hash functions and the respective hash function scaling factors.

Implementations can include one or more of the following features. For example, a scaling factor for a given egress port of the plurality of egress ports can be a ratio of a probability of the given egress port being selected in a joint probability distribution for the plurality of egress ports with a probability of an egress port with a lowest routing weight of the respective traffic routing weights being selected in the joint probability distribution. The probability of the given egress port being selected can be proportional with a routing weight associated with the given egress port The plurality of routing weights can be normalized such that a smallest routing weight of the plurality of routing weights has a normalized value of 1. The plurality of respective hash function scaling factors can include iteratively determining the plurality of hash function scaling factors.

The details of one or more implementations are set forth in the accompanying drawings and the description below. Other features will be apparent from the description and drawings, and from the claims.

DETAILED DESCRIPTION

This document describes systems and techniques for routing packets in a network. For example, a source device may transmit packets to a destination device using a multi-level network, where multiple data paths (links) may be available (used) to transmit data between the source device and the destination device. Data switches (or other data routing devices) in the multi-level network may use a weighted cost multi-path (WCMP) routing module to balance data traffic (between the source device and the destination device) over the multiple paths between the source device and the destination device. Such load balancing (e.g., WCMP data traffic routing) may be implemented using the techniques described herein.

Figure 1:
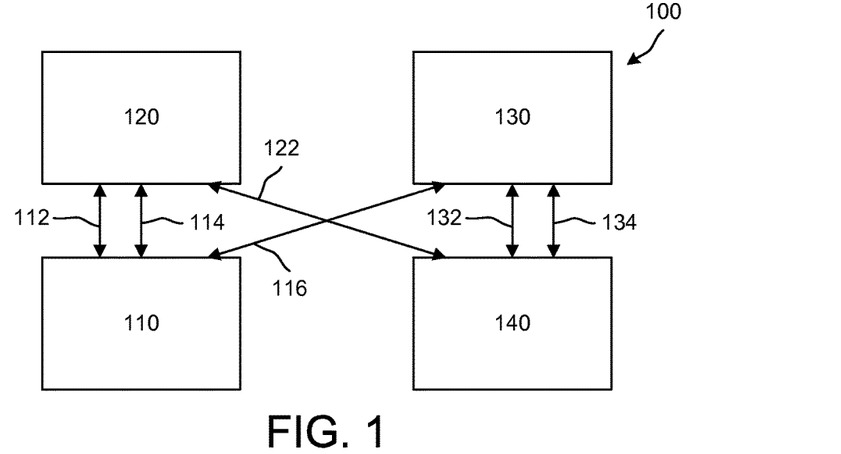
FIG. 1 is a block diagram illustrating a multi-level, multi-path network, in accordance with an implementation.

FIG. 1 is a block diagram illustrating a multi-level, multi-path network 100, in accordance with an implementation. The network 100 includes a first data switch 110, a second data switch 120, a third data switch 130 and a fourth data switch 140. The network 100 also includes data communication links 112, 114, 116, 122, 132, 134, which are used to communicate data (e.g., packet data) between the data switches 110, 120, 130, 140. The data switches 110, 120, 130, 140 may include a number of different devices, such as a network data switch, a router, or other device capable of communicating (steering, routing, switching) data (such as packet data) from a source device to a destination device.

The network 100 illustrated in FIG. 1 (which may be referred to as a multistage network) is shown for purposes of illustration. In other implementations, such multistage networks may include a large number of data communication devices (data switching devices). For example, such multistage networks may be used to implement large-scale commercial networks, such as commercial data center networks (DCNs). Scalability of such networks may be achieved by using relatively inexpensive and power-efficient commodity data switch devices as the building block at each network stage, instead of using fewer relatively expensive, high-end, large and complex switches.

In such multistage networks, data traffic may be routed using equal cost multi-path (ECMP) routing for load-balancing data traffic across the different switches at each stage. When the data switches in a multistage network, such as the data switches in the network 100, have more than one neighbor on which they can forward data traffic toward a given destination (e.g., with all resulting routes preferably being of a same length), ECMP randomly distributes (e.g., using a hash function and a corresponding modulus operation) to route different data traffic flows destined for the given destination across a group of ports connected to those neighbors, with substantially the same probability of each path being selected for a given data flow. For instance, if two communication links connect a first data switch and a second data switch, using ECMP would result, over a sufficient sample size, in fifty percent of data traffic that is communicated between the first switch and the second switch being communicated over one data communication link and the other fifty percent of data traffic being communicated over the other data communication link. Accordingly, such ECMP approaches may provide substantially equally balanced traffic distribution in multistage networks that are of uniform topology (e.g., there is a same number of data links from a given data switch to each neighboring switch along parallel data paths).

However, ECMP approaches would not (e.g., presuming the use of statistically sufficient random selection) provide such evenly balanced traffic distribution in multistage networks that have uneven inter-stage connectivity topologies. For example, in a network with such an uneven inter-stage connection topology, the ports (ingress ports and egress ports, which may also be referred to as communication links, or links) that connect a sending switch with its neighboring switches on parallel paths are not evenly distributed.

As illustrated in FIG. 1, the network 100 includes such an uneven inter-stage topology (connectivity). For instance, in the network 100, the data switch 110 may communicate data traffic to the data switch 140 via the data switch 120, or via the data switch 130. However, there are two links 112, 114 connecting the data switch 110 and the data switch 120, while there is only one link 116 connecting the data switch 110 and the data switch 130.

Such uneven inter-stage connectivity in such a multistage network may occur, for instance, by design. This design choice may occur because of the number of data switches present at each stage (e.g., due to the configuration of the particular network), or may occur because the multistage network was intentionally configured to leverage certain traffic locality patterns with uneven inter-stage connectivity. In other instances, uneven inter-stage connectivity in a multi-stage network may occur as a result of link failures between data switches in the network.

Weighted cost multi-path (WCMP) data routing may be used to overcome, at least some of, the shortcomings of ECMP to evenly balance data traffic in such multi-stage networks with uneven inter-stage topologies. Because ECMP, which inherently assumes that all paths to a certain destination have a same capacity, balancing data traffic across unevenly distributed links with equal probability results in unequal traffic loading.

For example and purposes of illustration, with reference to FIG. 1, consider using ECMP for routing data traffic from the data switch 110 to the data switch 140 (where that traffic can go through either the data switch 120 or the data switch 130). Because ECMP routes data traffic using an equal-probability hashing function (e.g., and a corresponding modulo function), that is equally like to select each of the egress ports (links) 112, 114, 116 of the data switch 110 (which, in this example, are presumed to have equal capacity) for a arbitrary data flow, using ECMP would (over a population of data flows) result in twice as much data traffic being sent to data switch 120 (e.g., over the links 112, 114) as compared to the amount of data traffic sent to the data switch 130, despite the fact that the overall capacities of the two parallel paths from the switch 110 to the switch 140 (i.e., respectively through the switch 120 and the switch 130) are substantially the same (e.g., each of the links 112, 114, 116, 122, 132, 134 have the same capacity).

Accordingly, using ECMP in the network 100 (with its uneven inter-stage topology) leads to (for data traffic from the switch 110 to the switch 140) underutilizing the path through data switch 130 by 50% compared to using WCMP, where the links 112, 114 (from the switch 110 to 120) each have a weight of "1" and the link 116 (from the switch 110 to the switch 130) has a weight of "2", resulting in twice as much data traffic (from the switch 110 to the switch 140) being routed on the link 116 as each of the links 112, 114.

Currently data switching devices (e.g., commodity data switches) support ECMP functionality, but have no direct functional support (hardware, software and/or firmware) for WCMP data traffic routing. Instead, WCMP functionality is accomplished by overloading (replicating entries in) an ECMP table to achieve WCMP traffic routing. Referring still to FIG. 1, and the example discussed above, WCMP traffic routing may accomplished for data traffic from the data switch 110 to the data switch 140 by using an EMCP table with four entries, where each of the links 112, 114 is listed once and the link 116 has a replicated listing (is listed twice), for a total of four entries. Such an approach represents a routing weight of "2" for the link 116 (by virtue of being listed twice) and a routing weight of "1" for each of the links 112, 114 (by virtue of them each being listed once).

While in the above example, WCMP may easily implemented by replicating the egress port listing for the link 116 in an EMCP table, such an approach does not work well for large scale multi-level networks, such as on networks on the order a commercial DCN. Scalability of WCMP in such networks has multiple considerations. For example, one consideration is the ability to support an arbitrary mix of weights with sufficient resolution in the switches of such networks. In large scale networks (e.g., with uneven inter-stage topologies), using ECMP tables with replicated entries to implement WCMP would typically require a prohibitive degree of replication (i.e., the required table sizes would likely far exceed the capacity of memory structures currently used to implement ECMP tables).

Another scalability concern for WCMP in large scale multi-level networks is the complexity of updating routing weights in the switches used to implement those networks. For instance, in such large scale multi-level networks (e.g., DCNs), relatively simple changes in routing weights may become large complex operations. For example, consider changing a routing weight of "5" to a routing weight of "4" in for a group with current weights 5, 30, 75, 40. Because current implementation do not take into account previous table configurations when altering routing weights, such a change could require rewriting, potentially, 149 table entries (e.g., 4+30+75+40). Accordingly, the amount of work can be arbitrarily large for even a small delta in weights.

Figure 2:
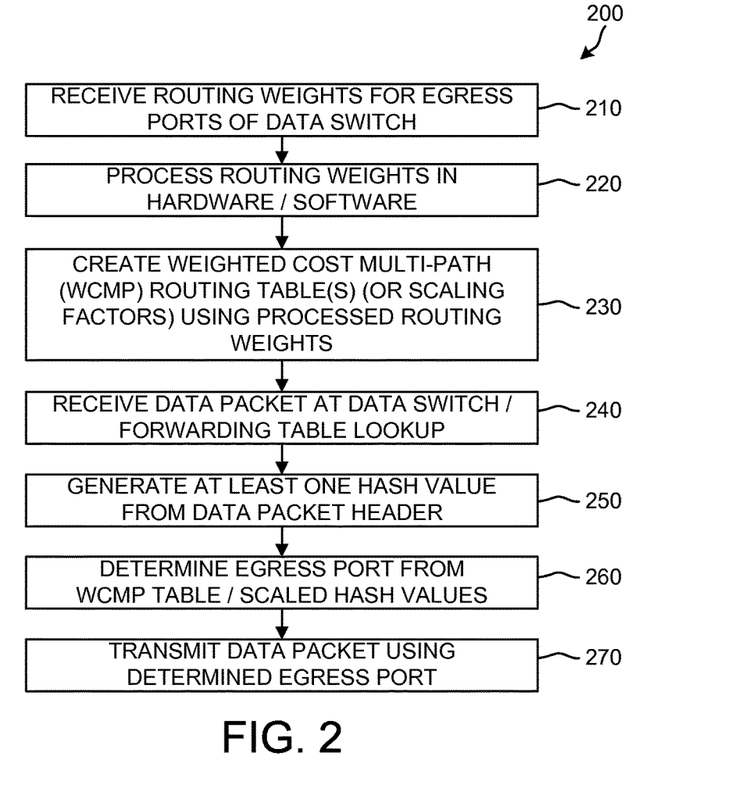
FIG. 2 is a flowchart illustrating a method for routing data traffic in a multi-level, multipath network, according to an example implementation.

FIG. 2 is a flowchart illustrating a method 200 for WCMP data traffic routing in a multi-level, multipath network, according to an example implementation. The method 200 is provided by way of illustration and may be implemented using a number of approaches, such as those described herein. In other implementations, other approaches may be used to implement WCMP data traffic routing.

The method 200 includes, at block 210, receiving a set of routing weights for a group of egress ports of a data switch. For instance, the routing weights received at block 210 may correspond with a group of egress ports that can be used to send data traffic to a particular destination. The routing weights of block 210 may be used to implement WCMP data traffic routing for data traffic sent from the data switch to that particular destination. The routing weights may be provided to the data switch using a number of approaches. For example, the routing weights may be provided to the data switch from a network configuration system. The data switch, at block 210, may receive the routing weights via a management port, via a configuration packet, or by a number of other approaches.

At block 220, the method 200 includes processing (which may also be referred to as pre-processing) the routing weights received at block 210, such as using hardware or software (or firmware) for use in a WCMP table (or WCMP tables). At block 230, the processed (pre-processed) weights of block 220 may be used (further processed) to create one or more WCMP data routing tables, where the WCMP table(s) created at block 230 may be used to route data traffic from the data switch of block 210 to the particular destination with which the received routing weights are associated. The one more WCMP tables of block 230 may be stored in the data switch using hardware, software, or a combination thereof.

At block 240, a data packet may be received at the data switch of block 210. When the data packet is received, the data switch may determine a destination address of the data packet. The destination address may then be looked up in a forwarding table to determine a corresponding routing table (or tables) to use to determine an egress port to use to send the received data packet along to its destination. If the destination address of the data packet received at block 240 corresponds with the destination address associated with the routing weights received at block 210, the forwarding table lookup may return a pointer to the WCMP table (or tables) generated at block 230.

After a determination is made, at block 240, to use the WCMP table (or tables) of block 230 to determine an egress port (hardware port or data transmission link) to use for sending the data packet along to its destination, the method 200 includes, at block 250, generating at least one hash value from a header of the received data packet. In order to ensure that all data packets in a given data flow are sent on a same path, the hash value (or values) may be generated using one or more fields of the data packet header that, for a given data flow, have fixed values. For instance a flow identification field, a source address field, a destination address field, a protocol identification field and/or a number of other possible fields with fixed values for a given data flow. The specific header field (or fields) that are used for generating the one or more hash values may depend on the particular network implementation.

At block 260, the method 200 includes determining, by using the one or more hash values as lookup value(s) for the WCMP tables of block 230. The lookup, at block 260 returns (determines) an egress port of the data switch to use to forward the data packet onto its destination. At block 270, the method 200 includes transmitting the data packet using the determined egress port. In the method 200 (as well as other methods for performing WCMP data traffic routing), a number of different hash functions may be used. For instance, a CRC16 hash function, a CRC32 hash function, an AES hash function, an SHA hash function and/or a number of other hash functions may be used. The hash function(s) used should be selected such that the hash values generated are sufficiently random for data routing purposes in a multi-level network, such as those described herein.

Further, in example implementation, a modulus (remainder) of the hash value generated by the selected hash functions may be taken before performing a lookup in the WCMP table(s). The result of the modulus function may be used directly, or indirectly, depending on the implementation, as an index (or lookup value) for the WCMP table(s) of block 230. In such an approach, a modulus function that is applied may be based on the number of entries present in a WCMP table(s) on which the lookup will be performed. For instance, if a 16 bit hash value is generated from a data packet header and an associated WCMP table that will be used to determine an egress port on which to send the data packet has nine entries, the lookup value for the WCMP table may be determined by Equation 1 below:

$$\text{Lookup value} = \text{Hash\_value} \bmod 9 \qquad \text{Equation 1}$$

Which results in a lookup value between 0 and 8, which may be used as a lookup (or to generate a lookup value or search key) for a WCMP table with indices 0 through 8 (with 9 total entries). In certain implementations, the lookup value may be a function of the result of the modulus operation (e.g., an encoded version of the result of the modulus function). The specific structure and arrangement of the WCMP table(s) (and the associated lookup values) used in the method 200 will depend on the specific implementation.

Figure 3:
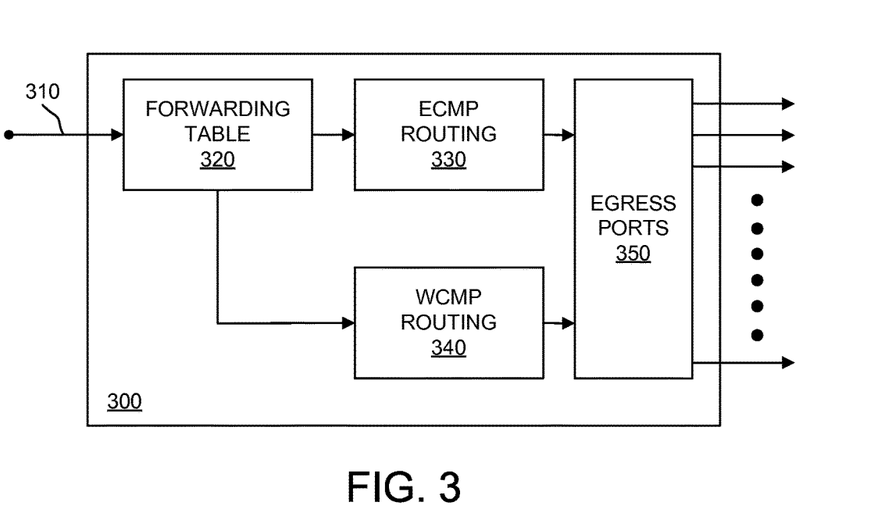
FIG. 3 is a block diagram illustrating elements of a data switch, according to an implementation.

FIG. 3 is a block diagram illustrating a data switch 300, according to an implementation. The data switch 300 of FIG. 3 includes an ingress port 310, a forwarding table 320, an ECMP routing module 330, a WCMP routing module 340 and a plurality of egress ports 350. The data switch 300 may also include other elements, such as a switch management port (management port), additional ingress ports, a (network) processor, memory structures, and so forth. The data switch 300 may be used, for example, to implement the techniques for WCMP routing described herein.

For instance, the data switch 300 may receive a set of routing weights for a particular destination, e.g., via the ingress port 310 or a management port (not shown) and use those weights to implement one or more WCMP routing tables that may be included in the WCMP routing module 340. The data switch 300 may also use the ECMP routing module 330 to implement ECMP data traffic routing for one or more destinations in a data network in which the data switch 300 is included, where each parallel path (the multipaths) between the data switch 300 and a given destination have uniform inter-level topologies.

In the data switch 300, when a data packet is received at the ingress port 310, the data switch 300 may determine a destination address for that data packet from its header. If the destination address of the received data packet corresponds with a destination address that is associated with a WCMP table (or tables) in the WCMP module 340 (e.g., corresponds with the received routing weights), the forwarding table 320 (when the destination address is used to perform a lookup in the forwarding table 320) may return a pointer to the corresponding WCMP routing tables in the WCMP routing module 340. An egress port of the egress ports 350 to use to communicate the data packet to its destination may then be determined from the corresponding WCMP table(s) or scaled hash values, such as by using the approaches described herein. After the particular egress port to use is determined, the data packet may be sent on to its destination using the determined egress port.

For purposes of illustration and clarity, the implementations described below with respect to FIGS. 4-8 will be described in the context of normalized data traffic routing weights and normalized hash values (from respective independent hash functions associated with each egress port for a given WCMP group). For instance, in the examples discussed below, a set of normalized routing weights may be determined from a given set of routing weights such that at least one routing weight of the normalized set of routing weights has an integer value of "1" and that the minimum routing weight value for the normalized set of routing weights is also an integer value of "1." For example, a set of data traffic routing weights of [2, 6, 14, 8] for a WCMP group of four egress ports may be normalized to a set of routing weights of [1, 3, 7, 4].

Likewise, hash values produced by the independent hash functions associated with the egress ports of a WCMP group may be normalized to be in a fixed range of values, e.g., in a range from 0 to 1. The initial (raw) hash values (before being normalized) may be produced using a modulus operation, such as described herein. Alternatively, in the example implementations discussed below, the hash values that are scaled using respective hash function scaling factors can be the "raw" hash values, such as 16 bit hash values, for example. The specific approach will depend on the particular hash functions used for the egress ports of a given WCMP group. For example, in certain implementations, the independent hash functions may produce raw hash values with different numbers of bits. In such an approach, a modulus operation may be used to produce hash values within a fixed integer range (e.g., based on a number of egress ports in an associated WCMP group) before normalizing the hash values.

Also in the examples below, groups of egress ports (e.g., WCMP groups) are described as having respective independent hash functions associated with each egress port of the given group. For purposes of this disclosure, independent hash functions may be defined as hash functions that are not dependent on one another and have equal probability of producing any particular value in a given, fixed range of values for a statistically random population of data packets. The specific hash functions used in a particular implementation will depend on a number of factors, such as the configuration of a particular network in which they are used and/or the configuration of a data switch that is used to implement weighted (WCMP) data traffic routing using the approaches described herein.

Figure 4:
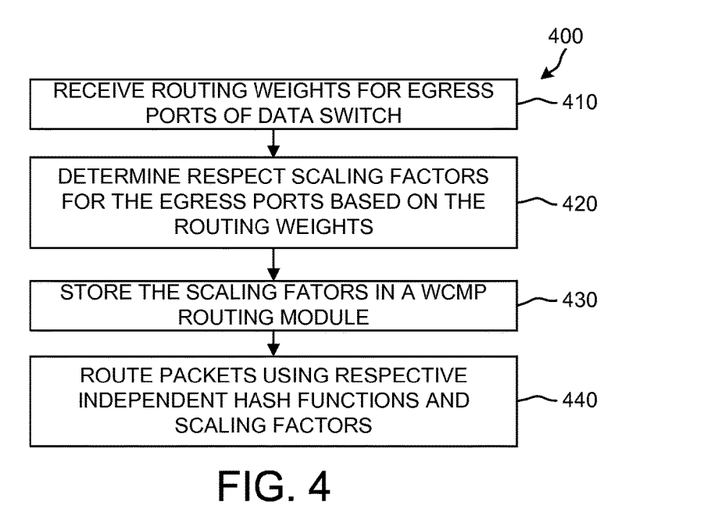
FIG. 4 is a flowchart illustrating a method for implementing weighted cost multi-path (WCMP) routing in a data switch, according to an implementation.

FIG. 4 is a flow chart illustrating a method 400 for implementing a weighted cost multi-path (WCMP) data traffic routing in a data switching device, according to an implementation. The method 400, along with other techniques described herein, may be used to implement a relatively simple (as compared to current approaches) and scalable approach for WCMP data traffic routing, as changes in data traffic routing weights can be implemented by changing a single hash function scaling factor for each egress port in a WCMP group as compared to writing a large, overloaded ECMP table.

As shown in FIG. 4, the method 400 includes, at block 410, receiving (e.g., at a data switch) a set of routing weights (WCMP weights) for a plurality of egress ports (e.g., of a given WCMP group). As described herein, the routing weights may be a set of routing weights for traffic being sent to a particular destination device. In other implementations, the routing weights may be for routing data traffic (e.g., using WCMP) to multiple destinations, or to a particular group of destinations. As noted above, the routing weights may be a normalized set of routing weights. Alternatively, the data switch may be configured to normalize the set of routing weights. As another alternative, the routing weights may an un-normalized set of routing weights.

Each routing weight of the set of routing weights of block 410 may be associated, respectively, with a specific egress port of the data switch. Each of the egress ports of the plurality of egress ports may be associated with an independent hash function, which will be used to generate, in parallel, independent hash values for each data packet (data frame, or other data unit used to transmit data from a source to a destination) received at the data switch. The independent hash functions may each be of a same class of hash functions, or can be of different classes. For example, the independent hash functions may all be independent CRC16 hash function variants. Alternatively, the independent hash functions may be a mix of CRC16, CRC32, AES, SHA and/or other types of hash functions.

At block 420, the method 400 includes determining, for each egress port of the plurality of egress ports, a respective hash function scaling factor, where the hash function scaling factor is based on the set of routing weights (e.g., a ratio of routing weights) and a joint probability distribution for routing data traffic with the plurality of egress ports according to their assigned routing weights. In an example implementation, the scaling factor for a given egress port of the plurality of egress ports may be a ratio of a probability of the given egress port being selected in a joint probability distribution for the plurality of egress ports with a probability of an egress port with a lowest routing weight of the respective traffic routing weights being selected in the joint probability distribution, where the probability of the given egress port being selected is proportional with a routing weight associated with the given egress port. At block 430, the scaling factors may be stored in a WCMP traffic routing module (e.g., the WCMP routing module 340) of the data switch. Example approaches for determining such hash function scaling factors are described below with respect to FIGS. 7 and 8.

At block 440, the method 400 includes routing a data packet using the respective independent hash functions and the respective hash function scaling factors. For instance, respective independent hash values based on one or more fields of the packet (e.g., one or more packet header fields) may be produced by each independent hash function (each being associated with an egress port a WCMP group). Depending on the specific implementation, the independent (parallel) hash values for the data packet may be normalized to a fixed range (e.g., 0 to 1). The independent hash values may then be scaled using their corresponding scaling factors determined at block 420. The scaled hash values may then be examined to select an egress port on which to transmit the data packet towards its destination. For example, an egress port may be selected by determining the highest scaled hash value and selecting the corresponding egress port for transmitting the data packet towards its destination. In situations where two or more scaled hash values have the same value (e.g., a "tie"), an egress port with a lowest port index may be selected from the egress ports with the same highest scaled hash function value. Alternatively, in the case of a "tie", an egress port for that packet (and other packets in an associated data flow) can be randomly selected. For instance, for the first data packet in such a flow, a random selection can be made, with all subsequent packets in the data flow being forwarded on that randomly selected egress port.

Figure 5:
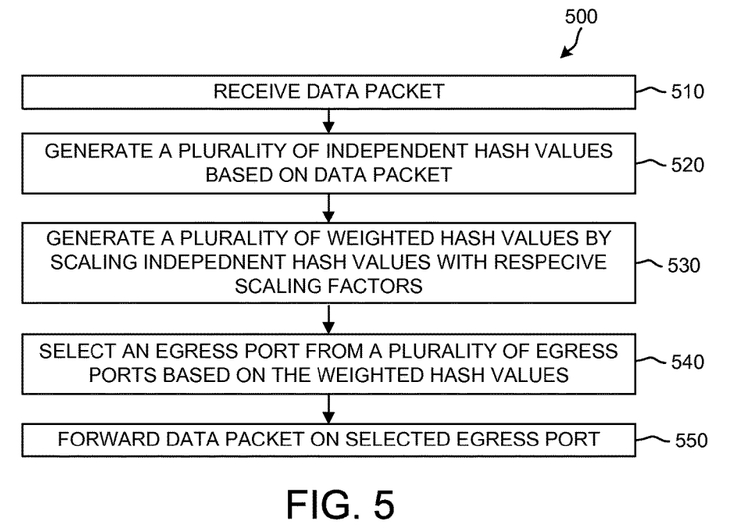
FIG. 5 is a flowchart illustrating a method for implementing WCMP routing in a data switch, according to an implementation.

FIG. 5 is a flowchart illustrating a method 500 for implementing WCMP routing in a data switch, according to an implementation. As with the method 400, the method 500 uses respective independent hash function and scaling factors to generate respective scaled hash values, where the scaling factors are based on routing weights associated with egress ports of a WCMP group. The scaling factors may be iteratively determined (e.g., using approaches such as those described below with respect to FIGS. 7 and 8) based on a weighted joint probability distribution for the plurality of egress ports of a given ECMP group.

Briefly, a given scaling factor for a given egress port of a WCMP group that has a normalized routing weight of greater than 1 (e.g., does not have the smallest routing weight of an associated set of routing weights) may be determined by equating a ratio of 1 (e.g., the normalized routing weight of an egress port with the lowest routing weight) and the normalized routing weight of a given egress port with a ratio of the probability of the egress port with the lowest routing weight being selected (in the weighted joint probability distribution) and a probability of the given egress port being selected (in the weighted joint probability distribution). Again, example approaches for determining such scaling factors are described below.

As shown in FIG. 5, the method 500 includes, at block 510, receiving, at a data switch with a plurality of egress ports (e.g., in a WCMP group), a data packet. The method 500 also includes, at block 520, for each egress port of the plurality of egress ports, generating, by the data switch, an independent hash value based on one or more fields of the data packet. As describe herein, the one or more fields of the data packet can include one or more fields of a header of the data packet, where the one or more fields of the header of the data packet having fixed values for each data packet of a data flow associated with the data packet.

As discussed herein, the respective independent hash values for each of the egress ports may be generated using respective independent hash functions associated with each of the egress ports. The respective independent hash functions can be predetermined (coded in software, hardware and/or firmware), assigned by the data switch, assigned by a network administration system or may be determined using a number of other approaches, such as random selection from a pool of available hash function options.

At block 530, the method 500 includes, for each egress port of the plurality of egress ports, generating a weighted hash value by scaling the independent hash value produced at block 520 using a scaling factor, such as a scaling factor that is determined using the approaches described herein. At block 540, the method 500 includes selecting an egress port of the plurality of egress ports based on the respective weighted hash values for the plurality of egress ports. For instance, an egress port associated with the largest scaled hash value for the data packet can be selected. In a case where two or more egress ports "tie" for the largest scaled hash value, the egress port with the smallest index can be selected. In other implementations, different criteria may be used to break "ties" for the largest scaled hash value. At block 550, the method 500 includes transmitting the data packet using the egress port selected at block 540.

Figure 6:
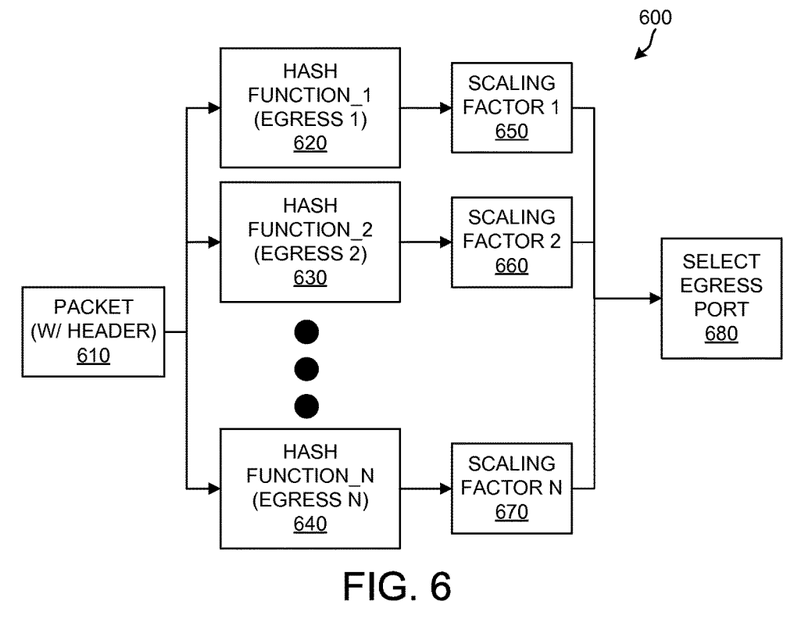
FIG. 6 is a block diagram illustrating a data switch, according to an implementation.

FIG. 6 is a block diagram schematically illustrating a data switch 600, according to an implementation. The data switch 600, which, in this example, has N total egress ports in a WCMP group, can be used to implement the methods 400 and 500 described above. As shown in FIG. 6, the data switch 600 can receive a packet 610 (with a packet header). The data switch 600 can then generate N independent hash values (e.g., from one or more header fields of the data packets 610) using the independent hash functions 620, 630, 640, where each independent hash value is associated with a specific egress port of the N egress ports of WCMP group. The data switch 600 can then scale the independent hash values using respective scaling factors 650, 660, 670 for each of the N egress ports. At block 680, the data switch 600, can then select an egress port of the N egress ports on which to transmit the data packet 610 based on the scaled hash values generated from the data packet.

By way of illustration, the data switch 600 can generate the respective independent hash values for the plurality of egress ports by generating a first hash value using the hash function_1 620, where the first hash value is associated with an egress port 1 (index of 1) of the plurality of egress ports (the WCMP group). Generating the respective independent hash values for the plurality of egress ports in the data switch 600 can further include generating a second hash value using the hash function_2 630, where the second hash value is associated with an egress port 2 (index of 2) of the plurality of egress ports (the WCMP group). Still further, generating the respective independent hash values for the plurality of egress ports in the data switch 600 can further include generating a third hash value using the hash function_N 640, where the third hash value is associated with an egress port N (index of N) of the plurality of egress ports. In the example approach, the third hash function is different than, and independent of, the first hash function and the second hash function, and the second hash function is different than, and independent of, the first hash function.

Figure 7:
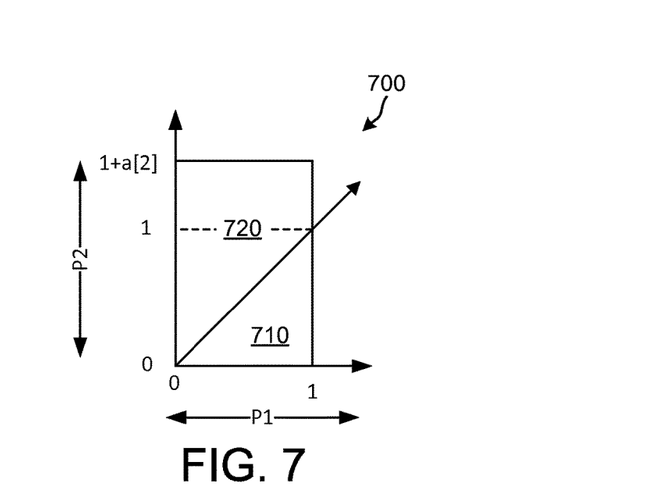
FIG. 7 is a diagram illustrating a joint probability distribution that can be used to determine weighted traffic routing scaling factors, according to an implementation.

FIG. 7 is a diagram illustrating a joint probability distribution 700 that can be used to determine weighted traffic routing scaling factors, according to an implementation. For instance, the joint probability distribution 700 can be used to illustrate an approach for iteratively determining scaling factors for a data switch with a WCMP group of two egress ports, P1 and P2 in this example. The joint probability distribution 700 illustrates a weighted probability distribution using variables that can be iteratively solved for in order to determine respective scaling factors for each of the egress ports P1 and P2 that will achieve the desired traffic routing weights for a given set of routing weights.

In the following discussion, for illustrative purposes, normalized routing weights of [1, 2] for the ports P1 and P2 will be used, respectively. In other implementations, other routing weights may be used. Also in the following discussion, it is presumed that hash values produced by respective independent hashing functions for each of the egress ports P1, P2 are normalized to have values in a range of 0 to 1, such as has been described herein. In FIG. 2, the scaling factors for the egress ports P1 and P2 are represented on axes that are designated with their corresponding port numbers. The diagonal line in FIG. 7 divides the joint probability distribution 700 into a first region 710 and a second region 720. The first region 710 (the area of the first region 710) represents the probability that a given data packet will be routed on P1 (with a WCMP weight of 1) and the region 720 (the area of the region 720) represents the probability that a given data packet will be routed on P2 (with a WCMP weight of 2).

In this example, the scaling factor for the egress port with the lowest routing weight (egress port P1), which has a normalized routing weight of 1, can be set to a value of a[1]=1. As described herein, the scaling factor for egress port P1 can be used as a multiplier for independent hash values generated by an associated hash function. In this example, the scaling factor for the egress port P1 will be referenced as m[1]. The scaling factor m[1]=1 is shown on the axis designated P1 in FIG. 7.

After setting the scaling factor m[1] for P1 at 1, the scaling factor for P2 (m[2]) can be assigned a value of m[2]=a[1]+a[2]=1+a[2]. The scaling factor m[2] is shown on the axis designated P[2] in FIG. 7. If, in the joint probably distribution 700, the scaling factor m[2] was simply set to its WCMP weight of 2 by setting a[2]=1, the joint probability distribution 700 would have an total area of 2, as shown below:

$$\text{Area} = a[1] \cdot (1+a[2]) = m[1] \cdot m[2] = 1 \cdot 2 = 2$$

Accordingly, in this situation, the area of the first region 710 in the joint probability distribution 700 would be ½, the area of the right triangle of the first region 710. Therefore, the area of the second region 720 and the joint probability distribution 700 would be 1½ (e.g., the total area of 2 minus the area of the first region 710). Therefore, in this situation, the probability of forwarding on the egress port P1 is the probability that the scaled hash value for the egress port P1 is greater than the scaled hash value for the egress port P2. That probability is equal to the ratio of the area of ½ of the first region 710 to the total area of the joint probability distribution 700 of 2, thus that probability equals ¼ (½ divided by 2). Likewise, the probability of forwarding on the egress port P2 is the probability that the scaled hash value for the egress port P2 is greater than the scaled hash value for the egress port P1. That probability is equal to the ratio of the area of 1½ of the second region 720 to the total area of the joint probability distribution 700 of 2, thus that probability equals ¾ (1½ divided by 2). Accordingly, the resulting forwarding weights ratio would be 1:3 instead of the desired 1:2 ratio for the normalized desired WCMP routing weights for the ports P1, P2 and result in inaccurate traffic weighting.

Referring still to FIG. 7, the joint probability distribution 700 may be used to determine scaling factors that accurately achieve the desired WCMP routing weights of [1, 2] using the approach described below. In the following discussion, for purposes of illustration and clarity, the scaled hash values for the egress ports P1, P2 for a given data packet will be referred to, respectively, as H[1] and H[2].

If we again fix the multiplier for egress port P1 as m[1]=1, we can then find the scaling factor m[2]=1+a[2], where a>0, such that the ratio R=Prob(H[1]≥H[2])/Prob(H[2]>H[1]) is equal to ½ (i.e., the desired ratio of the normalized routing weights). From the joint probability distribution 700 of FIG. 7, it can be determined that where R is equal to the ratio of the desired routing weights for the egress ports P1, P2, the ratio R=area(region 710)/area(region 720)=½/(½+a[2]). Accordingly, for R=½ (for the desired routing weights), a[2]=½. Accordingly, in this example, the scaling factor m[2] for the egress port P2 should be m[2]=1+a[2]=1.5 in order to achieve the desired WCMP traffic routing weight ratio of 1:2 for the ports P1, P2.

Figure 8:
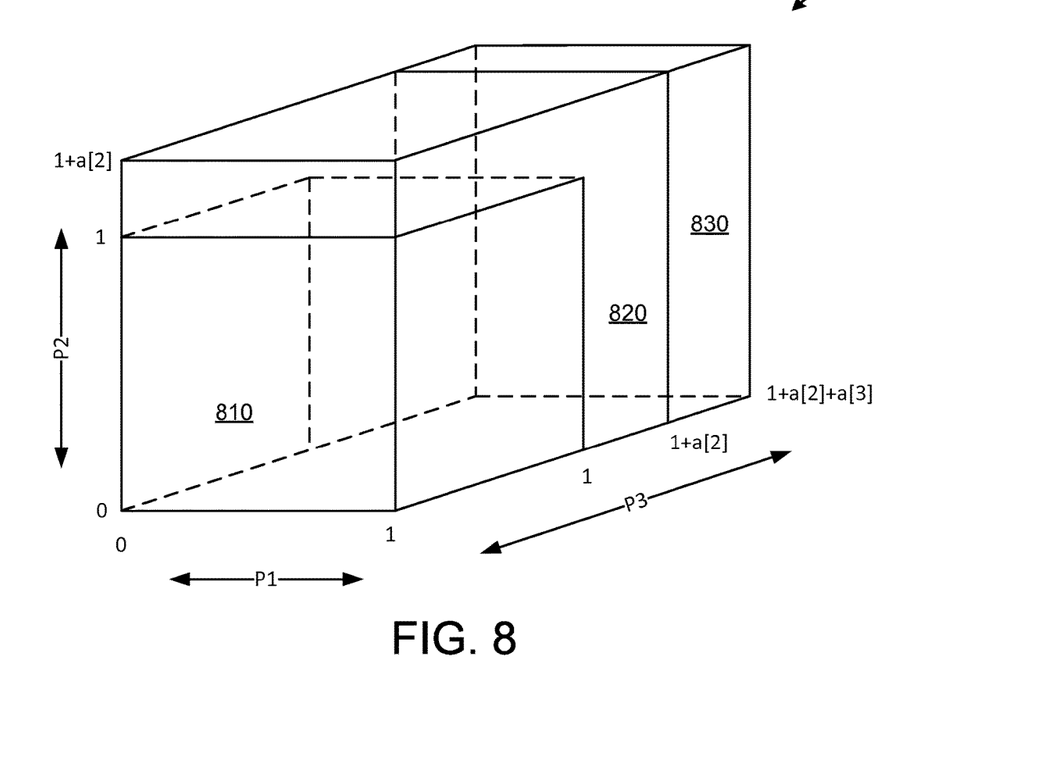
FIG. 8 is a diagram illustrating another joint probability distribution that can be used to determine weighted traffic routing scaling factors, according to an implementation.

FIG. 8 is a diagram illustrating another joint probability distribution 800 that can be used to determine weighted traffic routing scaling factors, according to an implementation. Using the concepts discussed above with respect to FIG. 7, the joint probability distribution 800 can be used to illustrate an approach for iteratively determining scaling factors for a data switch with a WCMP group of three egress ports, P1, P2 and P3 in this example. The joint probability distribution 800 illustrates a weighted probability distribution using variables that can be iteratively solved for in order to determine respective scaling factors for each of the egress ports P1, P2, P3 that will achieve desired traffic routing weights for a given set of routing weights.

In this example, it will be assumed that the desired respective WCMP routing weights (w[1], w[2] and w[3]) for the egress ports P1, P2, P3 have values such that w[1]≤w[2]≤w[3]. As with the example discussed above with respect to FIG. 7, we can determine scaling factors for the egress ports P1, P2, P3 by iteratively solving for constants that may be used to determine the appropriate scaling factors (e.g., m[1]=a[1], m[2]=a[1]+a[2], m[3]=a[1]+a[2]+a[3]) in order to implement the desired traffic routing ratios for a given set of WCMP routing weights for the egress ports P1, P2, P3, These values are represented on axes that are designated with their corresponding port numbers.

As in the example described above with respect to FIG. 7, the scaling factor m[1] for P1 can be set as m[1]=a[1]=1 (e.g., where P1 also has a normalized WCMP routing weight of 1). In other implementations, the scaling factor m[1] could be set to a different value and/or egress port P1 could have a WCMP routing weight that is different than 1.

As shown in FIG. 8, the joint probability distribution 800 is a rectangular box with edges of 1, 1+a[2], and 1+a[2]+a[3]. Again, it is presumed that the joint probability distribution 800 has a uniform probability density. In FIG. 8, the overall joint probability distribution 800, for purposes of this discussion, may be referred to as having a volume of V. As illustrated in FIG. 8, the volume V includes a first region 810, a second region 820, and a third region 830 that make up the total volume V of the joint probability distribution 800. As with the example discussed above for FIG. 7, the scaled hash values for the ports P1, P2, P3 corresponding with the joint probability distribution 800 will be respectively referred to as H[1], H[2], H[3].

For purposes of this discussion, the following events (Boolean events) can be defined:

MAX1: max(H[1],H[2],H[3])=H(1)
MAX2: max(H[1],H[2],H[3])=H(2)
MAX3: max(H[1],H[2],H[3])=H(3).

In FIG. 8, the region 810 can be defined as a volume (V[1]) of the joint probability distribution 800 where H[1], H[2], and H[3] are all less than or equal to 1 The region 820 can be defined as a volume (V[2]) of the joint probability distribution 800 where H[2] and H[3] are both less than or equal to 1+a[2] minus the volume V[1] of the region 810. Further, the region 830 can be defined as the volume (V[3]) of the joint probability distribution 800 where H[3] is less than or equal to 1+a[2]+a[3] minus the volume V[1] and the volume V[2].

In this example, given that the joint probability distribution 800 is a uniform probability distribution, in the region 810, the probability of each of the scaled hash values H[1], H[2], H[3] being the maximum of the three values is equal, or ⅓. In the region 820, the probability of H[1] being the maximum is 0, while the probability of H[2] or H[3] being the maximum is equal or ½. Further, in the region 830, the probability of H[1] or H[2] being the maximum is 0, while the probability of H[3] being the maximum is 1, as H[3] has the only scaled hash values in the region 830.

In terms of probability the union of the regions 810, 820, 830 covers the probability space of volume V. Accordingly the volumes of each region may be used to iteratively determine the scaling factors for each of the associated egress ports. Again, in this example, the scaling factor m[1]

for the egress port P1 can be fixed at a value of 1. Accordingly the volume for each of the regions may be expresses as follows:

Volume(region 810)=$V[1]$=1,

Volume(region 820)=$V[2]$=(1)(1+$a[2]$)(1+$a[2]$)−$V[1]$
=(1+$a[2]$)$^2$−1,

Volume(region 830)=$V[3]$=(1)(1+$a[2]$)(1+$a[1]$+$a[2]$)−$V[1]$−$V[2]$=(1+$a[2]$)($a[3]$).

By the law of total probability, using the events and volumes discussed above, it can be shown that Prob(M1):Prob(M2):Prob(M3)=$V[1]$/3:($V[1]$/3+$V[2]$/2):($V[1]$/3+$V[2]$/2+$V[3]$), which indicates that $a[2]$ can be directly computed from the equation $w[1]$/$w[2]$=Prob(M1)/Prob(M2), as there is 1 equation and 1 unknown. Further, after $a[2]$ is determined, $a[3]$ could be then directly computed from the equation $w[1]$/$w[3]$=Prob(M1)/Prob(M3), as that would also be a calculation for 1 equation and 1 unknown. Once the values of $a[2]$ and $a[3]$ are determined for a given set of normalized WCMP, such as in this example, the scaling factors (such as for used in the data switch 600) can easily be computed (e.g., $m[1]$=$a[1]$=1, $m[2]$=$a[1]$+$a[2]$, $m[3]$=$a[1]$+$a[2]$+$a[3]$).

The concepts discussed above may be extended to implementations where a WCMP group includes more than three egress ports. Again, in such implementations, the WCMP routing weights may be normalized to a have the lowest routing weight of 1 and to also have a routing weight of 1 be the lowest routing weight for an associated WCMP group. For instance, for a data switch that has N egress ports in a given ECMP groups, the joint probability distribution would be N-dimensional. The volumes for each region of an associated joint (uniform) probability distribution may be determined by the following equations, where i is the port index for an egress port that is associated with the volume being calculated and the values of i range from 1 to N (the total number of egress ports in the ECMP group) and $R_i$ is the region of the joint probability distribution associated with the ith egress port.

$V(R_1) = a[1]^N$, $V(R_2) = a[1] \cdot (a[1]+a[2])^{N-1} - V(R_1)$, $V(R_3) = a[1] \cdot (a[1]+a[2]) \cdot (a[1]+a[2]+a[3])^{N-2} - V(R_2) - V(R_1)$, etc.

The variables $a[i]$ can be iteratively determined in succession, with each successive calculation solving one equation for one unknown by equating the ratio of desired routing weights for two given egress ports with a corresponding ratio of the volumes in the joint probability distribution associated with the given egress ports, such as discussed above with respect to FIG. 8.

Expressed generally, probability space volumes for each region of a joint probability distribution for a WCMP group with N members may be expressed as, for the ith egress port: For egress ports where i<N:

$V(R_i) = \Pi_{j=1}^{i}(\Sigma_{k=1}^{j} a[k])) \times (\Sigma_{k=1}^{i} a[k])^{N-i} - (\Sigma_{K=1}^{i-1}(R_K))$ And for the Nth egress port:

$V(R_N) = (\Pi_{j=1}^{N}(\Sigma_{k=1}^{j} a[k])) - (\Sigma_{K=1}^{N-1} V(R_K))$

As in the previous examples, the variables $a[k]$ can be determined by iteratively solving the foregoing equations for each egress port in order of their indices, e.g., P1, then P2, then P3, and so forth by equating them with corresponding ratios of the desired WCMP routing weights for the corresponding egress ports. Once the variables $a[k]$ are determined, the scaling factors for scaling the independent hash values for each egress port may be readily determined by the general equation:

$m[i] = \Sigma_{j=1}^{i} a[j]$

Further, egress ports that have equal routing weights for a given set of routing weights will have equal scaling factors.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer (or device) or on multiple computers (or devices) at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer or device. Generally, a processor will receive instructions and data from a read-only memory or a random access memory or both. Elements of a computer or device may include at least one processor for executing instructions and one or more memory devices for storing instructions and data. Generally, a computer or device also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A method comprising:
    receiving, at a data switch, a data packet, the data switch including a plurality of egress ports;
    for a given received data packet:
        for each of the egress ports:
            generating, by the data switch, a hash value based on one or more fields of the given received data packet using a hash function associated with the egress port, wherein the hash function associated with each egress port is independent and different from the hash functions associated with the other egress ports, and
            generating a weighted hash value by scaling the hash value using a scaling factor, the scaling factor being based on at least two traffic routing weights of a plurality of respective traffic routing weights associated with the plurality of egress ports;
        selecting, for the given received data packet, an egress port of the plurality of egress ports based on the respective weighted hash values for each of the egress ports generated for the given received data packet; and
        transmitting, by the data switch, the given received data packet using the selected egress port.

2. The method of claim 1, wherein the one or more fields of the given received data packet include one or more fields of a header of the given received data packet, the one or more fields of the header of the given received data packet having fixed values for each received data packet of a data flow associated with the given received data packet.

3. The method of claim 1, wherein a scaling factor for a given egress port of the plurality of egress ports is a ratio of a probability of the given egress port being selected in a joint probability distribution for the plurality of egress ports with a probability of an egress port with a lowest routing weight of the respective traffic routing weights being selected in the joint probability distribution, the probability of the given egress port being selected in the joint probability distribution being proportional with a routing weight associated with the given egress port.

4. The method of claim 1, wherein the plurality of routing weights are normalized such that a smallest routing weight of the plurality of routing weights has a normalized value of 1.

5. The method of claim 1, wherein generating, for the given received data packet, the hash value for each of egress ports includes normalizing a plurality of respective hash values for the plurality of egress ports to respective values in a range of 0 to 1.

6. The method of claim 1, wherein selecting, for the given received data packet, the egress port of the plurality of egress ports includes selecting an egress port of the plurality of egress ports having a highest respective scaled hash value.

7. A data switch including a plurality of egress ports, the data switch comprising:
    at least one memory that is configured to store instructions; and
    at least one processor that is operably coupled to the at least one memory and that is configured to process the instructions to cause the data switch to:
        receive a data packet;
        for a given received data packet:
            for each of the egress ports:
                generate a hash value based on one or more fields of the given received data packet using a hash function associated with the egress port, wherein the hash function associated with each egress port is independent and different from the hash functions associated with the other egress ports, and
                generate a weighted hash value by scaling the hash value using a scaling factor, the scaling factor being based on at least two traffic routing weights of a plurality of respective traffic routing weights associated with the plurality of egress ports;
            select, for the given received data packet, an egress port of the plurality of egress ports based on the respective weighted hash values for each of the egress ports generated for the given received data packet; and
            transmit the given received data packet using the selected egress port.

8. The data switch of claim 7, wherein a scaling factor for a given egress port of the plurality of egress ports is a ratio of a probability of the given egress port being selected in a joint probability distribution for the plurality of egress ports with a probability of an egress port with a lowest routing weight of the respective traffic routing weights being selected in the joint probability distribution, the probability of the given egress port being selected in the joint probability distribution being proportional with a routing weight associated with the given egress port.

9. The data switch of claim 7, wherein selecting, for the given received data packet, the egress port of the plurality of egress ports includes selecting an egress port of the plurality of egress ports having a highest respective scaled hash value.

10. The data switch of claim 7, wherein the one or more fields of the given received data packet include one or more fields of a header of the given received data packet, the one or more fields of the header of the given received data packet having fixed values for each data packet of a data flow associated with the given received data packet.

* * * * *